United States Patent
Wünscher

[19]

[11] Patent Number: 5,943,841
[45] Date of Patent: Aug. 31, 1999

[54] COMMISSIONING SYSTEM

[75] Inventor: Eduard Wünscher, Hart bei Graz, Austria

[73] Assignee: Knapp Holding GmbH, Hart bei Graz, Austria

[21] Appl. No.: 08/809,791

[22] PCT Filed: Jul. 17, 1996

[86] PCT No.: PCT/AT96/00125

§ 371 Date: Mar. 28, 1997

§ 102(e) Date: Mar. 28, 1997

[87] PCT Pub. No.: WO97/03903

PCT Pub. Date: Feb. 6, 1997

[30] Foreign Application Priority Data

Jul. 18, 1995 [AT] Austria .................................. 1226/95

[51] Int. Cl.$^6$ .................................................. B65B 35/54
[52] U.S. Cl. .......................... 53/154; 53/155; 53/168; 53/237; 53/238; 364/478.04; 414/268; 414/273
[58] Field of Search ............................ 414/268, 273, 414/285; 364/478.04, 478.06, 478.07, 478.16, 478.17, 478.18; 53/147, 168, 154, 155, 237, 238, 240, 474, 443, 445

[56] References Cited

U.S. PATENT DOCUMENTS

| | | |
|---|---|---|
| 2,570,918 | 10/1951 | Chodziesner . |
| 3,247,929 | 4/1966 | Langley . |
| 3,379,321 | 4/1968 | Weir . |
| 3,561,619 | 2/1971 | Weir . |
| 3,616,944 | 11/1971 | Field . |
| 3,624,792 | 11/1971 | Lipfert . |
| 4,426,189 | 1/1984 | Weber et al. . |
| 4,501,528 | 2/1985 | Knapp . |
| 4,542,808 | 9/1985 | Lloyd et al. . |
| 4,792,273 | 12/1988 | Specht . |
| 4,870,799 | 10/1989 | Bergerioux et al. . |
| 4,874,281 | 10/1989 | Bergerioux et al. . |
| 4,921,087 | 5/1990 | Nakamura . |
| 5,230,206 | 7/1993 | Christ . |
| 5,238,145 | 8/1993 | Pippin . |
| 5,271,703 | 12/1993 | Lindqvist et al. . |
| 5,322,406 | 6/1994 | Pippin et al. . |
| 5,352,081 | 10/1994 | Tanaka . |
| 5,509,538 | 4/1996 | Spindler et al. . |

FOREIGN PATENT DOCUMENTS

| | | |
|---|---|---|
| 0282785 | 9/1988 | European Pat. Off. . |
| 0453682 | 10/1991 | European Pat. Off. . |
| 0494014 | 7/1992 | European Pat. Off. . |
| 0550764 | 7/1992 | European Pat. Off. . |
| 0515350 | 11/1992 | European Pat. Off. . |
| 0592729 | 4/1994 | European Pat. Off. . |
| 3629293 | 3/1988 | Germany . |
| 4225041 | 2/1994 | Germany . |

*Primary Examiner*—Daniel B. Moon
*Attorney, Agent, or Firm*—Sughrue, Mion, Zinn, Macpeak & Seas, PLLC

[57] ABSTRACT

In a commissioning system (1) comprising at least one central belt (3) for receiving products to be taken from a stock (16) by commissioners and to be assembled according to an order, and a conveying installation (8) to move away in collecting containers (9) the products transferred at a transfer site (3a) at the end of the central belt (3), containers (14) are adjacently arranged below the central belt (3) to receive the products, and a pre-determined number of the adjacently arranged containers (14) each define a respective commissioning region ($B_1$, $B_2$, $B_3$, . . . $B_n$) for a commissioner (A to F), a pre-determined number of product types on stock (16) is associated to each commissioning region ($B_1$, $B_2$, $B_3$, . . . $B_n$), and at least one of the commissioning regions neighboring a respective commissioning region forms a supplementary commissioning region to that commissioning region. The containers (14) empty their contents onto the central belt (3) under the control of a control computer (29), and for each commissioner (A to F) a terminal (37) is provided for communication with the control computer (29).

12 Claims, 4 Drawing Sheets

FIG.9 ion to a commissioning system comprising at least one central conveyor, in particular a central belt, for receiving products to be taken from a storage means by commissioners and to be assembled according to an order, and a conveying installation to move away in collecting containers the products transferred at a transfer site at the end of the central conveyor.

COMMISSIONING SYSTEM

BACKGROUND OF THE INVENTION

The invention relates to a commissioning system comprising at least one central conveyor, in particular a central belt, for receiving products to be taken from a storage means by commissioners and to be assembled according to an order, and a conveying installation to move away in collecting containers the products transferred at a transfer site at the end of the central conveyor.

The storing of a large number of products in wholesale, and the commissioning of various products according to an order is a problem which typcially occurs particularly in pharmaceutical wholesale, but also in the delivery of sound carriers (cf. DE 42 25 041 A). Orders are filled several times per day. The assembly and delivery of the products required should be effected as quickly as possible after the respective order has been received. To this end, also commissioning machines are frequently used (cf. e.g. EP 592 729 A); the latter do quickly and reliably put together the ordered products, yet they are comparatively expensive to buy, and, as a rule, they can only be used for certain products. In most instances, commissioning machines must be refilled manually and require a careful maintenance and service. An important element of a commissioning machine is the ejector which ejects a product from a stack. A malfunction at one ejector thus may block the entire course of commissioning.

With manual commissioning, such a malfunction cannot occur. With manual commissioning, usually each commissioner completely fills an order according to an order list or document, the type and number of pieces of products per order being largely variable, i.e. the commissioners are irregularly employed (unproductive time), which is detrimental from an economic point of view.

From DE 41 04 527 A and EP 282 785 A furthermore commissioning installations for items are known in which the items, e.g. medicaments, are stored in a paternoster shelf and from there are manually removed according to the commissioning orders and deposited in selected, tiltable intermediate storage containers, from where they are automatically transferred into transport containers passed by therebelow on a conveyor belt, when the order has been finished. Yet, due to the paternoster shelf, on the one hand, as well as to the transfer of the items directly into the transport containers, on the other hand, storage, and in particular also the commissioning possibilities, and above all the speed of commissioning or handling, is limited.

SUMMARY OF THE INVENTION

The invention has as its object to provide a commissioning system which has a low susceptance to failure, enables a guidance of the commissioners without any documents and ensures a uniform rate of employment of the commissioners and thus a reduction or elimination of unproductive times. Furthermore, the commissioning system is to be designed such that also a combination of automatic and manual commissioning is enabled in a synergistic manner.

The commissioning system of the above-defined type is characterized in that the central conveyor has a plurality of adjacently arranged containers associated therewith to receive the products, and that a pre-determined number of the adjacently arranged containers each define a respective commissioning region for a commissioner, a pre-determined number of associated product types on stock being associated to each commissioning region, and at least one of the commissioning regions neighbouring a respective commissioning region forming a supplementary commissioning region to that commissioning region, that the containers empty their contents onto the central conveyor under the control of a control computer, and that for each commissioner a terminal, in particular a portable radio terminal, is provided for communication with the control computer.

The structure according to the invention provides in an advantageous manner for a type of semi-automatic cmmissioning, in which the commissioner is guided without any documents on the basis of data transmitted to him or her via the (radio) terminal both in his or her own commissioning region and optionally in the neighbouring commissioning region (supplementary commissioning region) when bringing the products from the stock and depositing these products in the containers destined therefor, and in which the remaining procedures of commissioning are carried out automatically by the control mechanism, or by the control computer, respectively. As compared to a conventional guidance of commissioners, there result the following further advantages:

Processing of the orders may always be effected as far as possible in the sequence the orders have been received, under the control of the control computer, by priorization of earlier received orders, it being possible at any time to handle urgent orders first.

The efficiency remains practically unaffected by differences in the individual performance of the respective commissioners.

The system is capable of accommodating differences in the personal distribution times of a commissioner by being able to automatically distribute the work to neighbouring commissioners (and, furtheron, to their neighbouring commissioners).

The combination of orders of neighbouring commissioners has as its consequence the reduction to a minimum of the number of containers required per commissioner.

The respective handling of the most urgent portion of the order in the commissioning regions and supplementary commissioning regions minimizes the occupation times of the containers by a rapid completion of the entire order in the commissioning system, and thus additionally minimizes the number of containers required per commissioner.

Since the orders to be commissioned can be provided with a sequential identification (consecutive number) by the control computer according to the sequence in which they are dealt with, on account of the strategy of allocation (distribution of an order to commisioning region and supplementary commissioning region), the system is capable to react immediately to highly priorized orders by setting their sequential identification to "zero". The processing of order portions of such highly priorized orders is effected by the commisioners next available, immediately after they have finished their current order portions. Thereby, the commissioning system can provide urgent orders with minimum throughput time in the area of dispatching.

For a particularly rational processing of orders it has proven advantageous if the supplementary commissioning region comprises the product types of a neighbouring commissioning region.

A structurally simple and thus advantageous measure for further communication between the control computer and a commissioner consists in that each container has an associated indication light and/or a quitting switch connected with the control computer. With this, the respective commissioner can simply and directly be informed by aid of the indication light—which preferably is attached to the container itself—into which container he is to deposit the products; by means of the quitting switch the control computer can be informed that filling of the container has been completed.

For the commissioned products to get quickly and without any problems from the containers to the central conveyor, the containers are preferably formed by trays having bottoms capable of being pivoted downwards.

There, it is furthermore advantageous if the bottom of each tray is provided with a controllable opening mechanism.

An ergonomically suitable arrangement of the trays results in that the trays are provided on plate holders mounted above the central conveyor, the trays being inserted in apertures of the plate holders. Therein, the plate holders may be designed like table boards or shelf boards, and, particularly for a better view thereinto—may be arranged to be downwardly inclined towards the commissioner.

For rapidly filling an order, in particular if the central conveyor is very long, it has furthermore proven advantageous if the central conveyor is continuously driven.

To exactly determine the time at which the containers or trays are emptied onto the central conveyor, it is advantageously provided for that a path sensor is associated with the central conveyor and connected with the control computer.

For reasons of control technology it is particularly advantageous if the control computer is connected with a main computer, on the one hand, to receive orders and to demand products for the stock, and with a computer associated with an automatic machine, on the other hand, which receives the signals of the path sensor, of the quitting switch and of a collecting container recognition means at the transfer site at the end of the central conveyor and which controls the drive for the central conveyor, the drive of the conveying installation for the collecting containers, the opening mechanism and, optionally, the indication light for the trays.

To shorten the temporal course of commissioning as far as possible, it is preferred that shelves are arranged adjacent the central conveyor for storing the products associated with the respective commissioning region of a commissioner.

Advantageously, the central conveyor is subdivided into segments according to the orders, the length of the segments being individually defined by the control computer in accordance with the size of the order. Thus, each segment is allocated to a commissioning order, and by knowing the position of the central conveyor and its speed, the respective period of time until the segment will be emptied into the associated collecting container can be exactly determined.

Thus, the commissioning system described so far preferably consists of an array of trays arranged above a conveyor, in particular a central belt. Each commissioner is allocated a certain number of trays in a coherent region.

To process a customer's order, at first the computer distributes the assembly of the products as efficiently as possible to several commissioners, a particular "commissioning order" being defined for each of these commissioners. The products belonging to his or her commissioning order are taken by the respective commissioner from shelves which are arranged close to the central belt, and deposited into one of the trays. Thus, a customer's order will come to lie in several trays—depending on the number of commissioners involved. When all the commissioners have finished their work with that customer's order and deposited the pertaining products in the trays, the trays will be opened under control by the computer, at the suitable point of time. The products contained in the trays slide onto the central belt and are collected on the segment of the central belt associated with the customer's order. At the end of the central belt, the products are transfered to the transport and collecting container allocated to this order.

To improve the commissioning performance of the system, it is furthermore advantageous if at least one commissioning machine known per se and also comprising a central conveyor is additionally associated with the conveying installation, the central conveyor of the commissioning machine, viewed in the conveying direction, being arranged downstream of the central conveyor equipped with the containers for a possible automatic completion of the commissioning orders. Preferably, the commissioning machine there also includes a central belt as the central conveyor. In a "mixed" system of such structure, a particularly efficient grouping of ordered articles is enabled, in that manual or automatic commissioning takes place, depending on the type of product. In particular, it is proceeded as follows:

The respective commissioners prepare in the manual system those portions of the customer's order which are to be commissioned manually. On the other hand, the availability of products to be commissioned automatically is checked by aid of the commonly available sensing means on the machine channels and the stocktaking. If all the products of a commissioning order are present, and if the pre-commissioning in the manual system is reported to have been finished, collection of the portions of the customer's order is initiated. In temporally optimized sequence, the orders are collected on the central belts (or other collecting conveyors) of the manual system and of the commissioning machines.

A collecting container is allocated to the order at the transfer site of the manual system, and the products from the respective order portions are collected at the transfer sites of the systems. The collecting container then takes the direct course to the dispatching area, e.g., in which suitable sorting systems and paths of accumulation receive the collecting containers and routes are fixed.

Special articles which cannot be commissioned by the system described above are commissioned conventionally, directly into the containers, and reach the dispatching area via a separate supply path.

The inclusion of the manual system at the starting point of the entire plant has, above all, the advantage that commissioning containers are always available for the transfer of completed commissioned customer's orders.

In all the instances described it is advantageous to provide individual collecting containers for the individual orders.

For safety reasons and to avoid delivery errors, it is preferably provided for the conveying installation to pass through a checking zone after having received the products.

An advantageous supplement to the commissioning system also consists in that a supply path for filling special products into the collecting containers is provided on the conveying installation upstream of the checking zone.

BRIEF DESCRIPTION OF THE DRAWINGS

The invention will now be explained in more detail by way of preferred exemplary embodiments illustrated in the drawings, to which, however, it is not to be limited. Therein.

DETAILED DESCRIPTION OF THE INVENTION

Figures 1, 2:
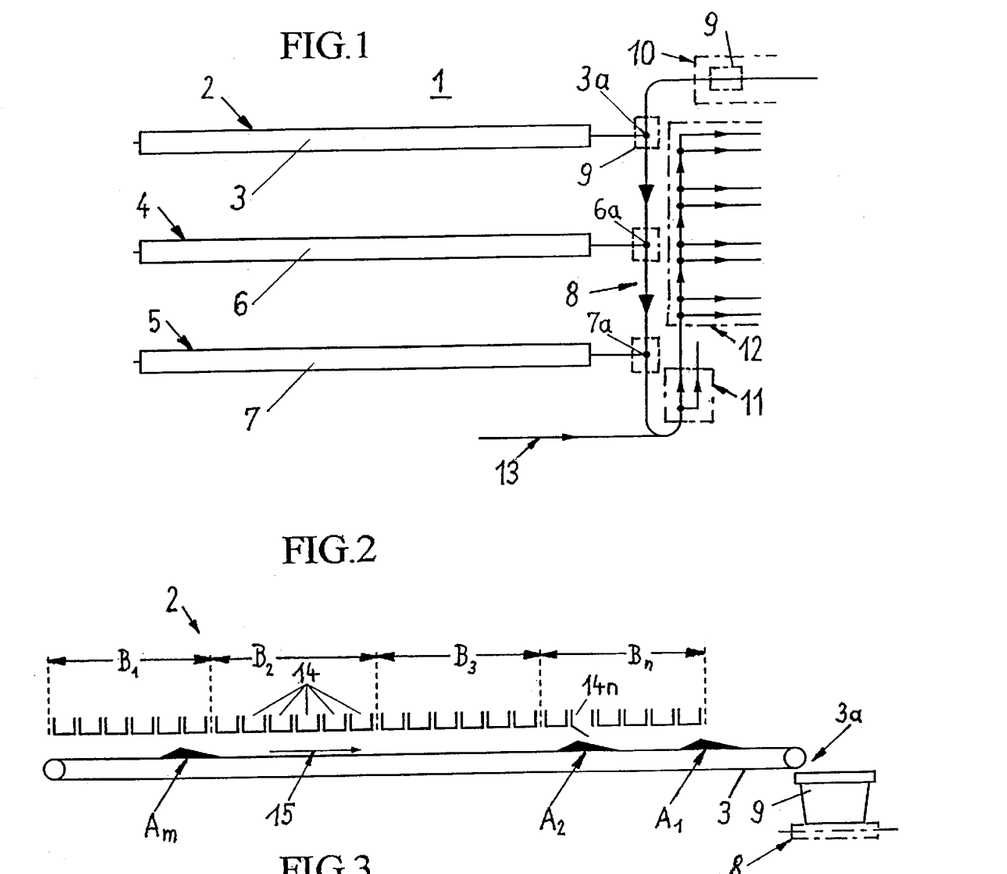
FIG. 1 shows a schematic illustration of an entire commissioning system comprising a manual commissioning installation in combination with two automatic commissioning machines.
FIG. 2 shows a schematic front view of the manual commissioning installation.

In FIG. 1, an entire commissioning system, at least at present being considered particularly preferred and advantageous, is generally denoted by 1, which, e.g., consists of a manual commissioning installation 2 having a central conveyor in the form of a central belt 3 as well as two automatic commissioning machines 4, 5 having central conveyors, in particular central belts 6, 7. At the discharge ends of the central belts 3, 6 and 7, a conveying installation 8 including collecting containers 9 is arranged, which collecting containers come from a collecting container stock 10 and receive the commissioned products at transfer sites 3a, 6a, 7a delivered from the central belts 3, 6 and 7. Following the last central belt 7, there is a checking zone 11 in the conveying installation 8, in which faultily commissioned products are separated, and missing products are noted. The conveying device 8 ends in a dispatching area 12, in which the commissioned goods are packed and assembled for delivery routes. In a zone arranged upstream of the checking zone 11, special products stored externally of the commissioning system 1, such as large-volume products, e.g., can be filled into the collecting containers 10, as is indicated by a supply path 13. The conveying installation 8 may, e.g., be designed as a roller or chain conveying device.

Figure 3:
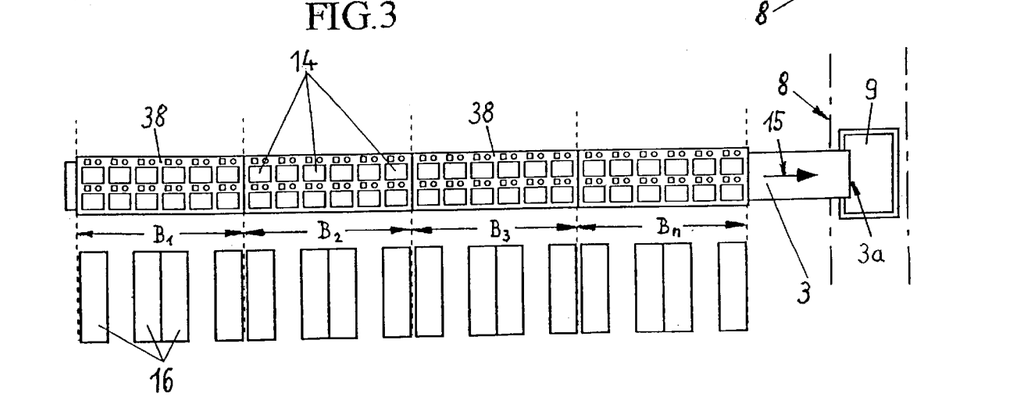
FIG. 3 shows a schematic top view on the manual commissioning installation.

As is apparent from FIGS. 2 and 3, with the manual or semi-automatic commissioning installation 2 of this commissioning system 1, a plurality of containers 14 are adjacently arranged above the central belt 3, two containers 14 arranged in transverse direction and six containers 14 arranged in the longitudinal direction of the central belt 3 each forming a commissioning region $B_1, B_2, B_3, \ldots B_n$ in this exemplary embodiment; these commissioning regions $B_1, B_2, B_3, \ldots B_n$ are each associated to a commissioner, as will be explained in more detail in the following.

On account of a suitable structure, the containers 14 may be downwardly opened, as will be explained in the following by way of FIG. 4, e.g., so that the products get onto the central belt 3 and there can be collected as orders $A_1, A_2, \ldots A_m$. In FIG. 2 an instance is illustrated in which one of the containers 14 has just been opened, and the commissioned product gets from the region $B_n$ to the region of the order $A_2$. The direction of movement of the central belt 3 there has been designated by 15.

In FIG. 3, shelves 16 arranged in the vicinity of the central belt 3 and acting as a storage means are shown, which are sub-divided into the commissioning regions $B_1, B_2, B_3, \ldots B_n$ just like the containers 14, certain types of products being stored in each of them which are mainly allocated to the commissioner acting in the respective commissioning region $B_1, B_2, B_3, \ldots B_n$.

Figures 4, 5:
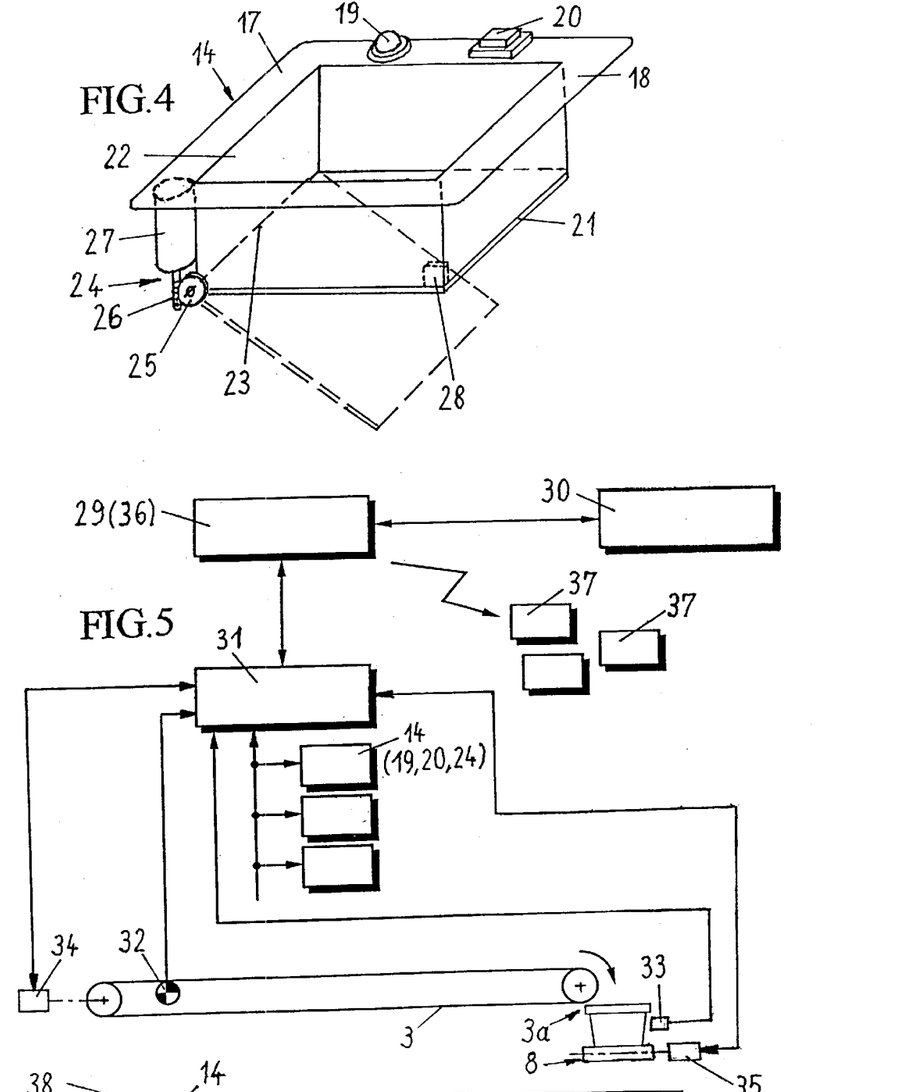
FIG. 4 shows a perspective view of a container used in the manual commissioning installation for the commissioning of products.
FIG. 5 is a schematic block diagram of a control means for the commissioning system.

The container 14 illustrated in FIG. 4 is designed as a tray 17 having a rim 18 in which an indication light 19 and a quitting switch 20 are installed, the functions of which will be explained in more detail below. On the lower rim of a side wall 22 arranged transversely to the direction of movement 15 of the central belt 3, the bottom 21 of the tray 17 is mounted so as to be pivotable about a transverse axis, the bottom 19 being connected with a shaft 23 defining this transverse axis. To open and to close the bottom 21, the shaft 23 carries a worm wheel 25 associated with the opening mechanism 24, a worm 26 of the drive shaft of an electric motor 27 whose sense of rotation is reversible engaging in the worm wheel. In the region of the bottom 21, a micro-switch 28 may be provided which emits a signal if the bottom 21 is being opened or closed, respectively.

Figure 6:
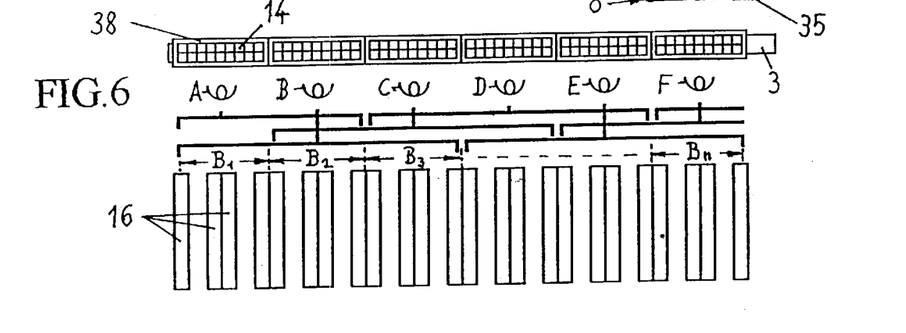
FIG. 6 is a schematic top view of the manual commissioning installation to illustrate the working manner of the commissioners.

In the block diagram of a control for the manual commissioning installation 2, as illustrated in FIG. 5 a control computer 29 on the one hand is connected with a main computer 30 for receiving orders as well as for demanding products from the stock or shelves 16, and with an automatic machine computer 31, on the other hand, which receives the signals from the quitting switch 20, the micro-switch 28, a path sensor 32 at the central belt 3 for determining the position of the central belt 3, and a collecting container detecting device 33 at the site of transfer 3a at the end of the central belt 3, and which controls the drive 34 for the central belt 3, the drive 35 of the conveying installation 8, the opening mechanism 24 and the indication light 19 of the trays 17. Furthermore, the control computer 29 comprises a radio installation 36 serving for communicating with the commissioners A, B, C, . . . F (FIG. 6). For this purpose, each commissioner A, B, C, . . . F is equipped with a terminal, in particular with a portable radio terminal 37 with alphanumeric display and keyboard. By aid of the alphanumeric display, the individual commissioner A, B, C, . . . F is informed about the type and number of products of an order, and via the keyboard of his terminal 37, he or she can confirm the removal of the products as well as carry out corrections, e.g. when there is a lack of products. In principle, e.g., also infrared transmitting and receiving installations may be used for communication purposes. In particular, terminal 37 may be of such a type as may be braced to the wrist or forearm.

As can be seen from FIGS. 3 and 6, the containers 14 (or the trays 17) are inserted in apertures (not illustrated) of frame-type plate holders 38 consecutively arranged above the central belt 3. The plate holders 38 may either be standingly connected with the ground, or they may be connected with posts or with a wall, respectively, in the manner of a shelf, or they may also be connected with the ceiling by means of suspension. The width of the plate holder 38 substantially corresponds to the width of the commissioning regions $B_1, B_2, B_3, \ldots B_n$.

Subsequently, the manner in which the commissioning system 1 described, in particular the manual commissioning installation 2, functions and is operated will be explained in more detail, particular reference also being made to FIG. 6.

A customer's order is composed of any desired products from the entire stock, i.e. from the products contained in the shelves 16 as well as in the automatic commissioning machines 4 and 5. Commissioning of these products is partly effected by the manual commissioning system 2, in which several commissioners, six commissioners A to F in this example, are acting, each equipped with a mobile radio terminal 37 fastened, e.g., to the forearm of the commissioners so as to keep free both hands for handling during commissioning.

The control computer 29 receives the contents of the customers' orders from the main computer 30, stores the same and hands them on to the automatic machine computer 31 in a certain processing sequence, which automatic machine computer then activates the respective peripheral installations, such as indication light 19, drive 33 for the central belt 3, drive 34 for the conveying installation 8 etc., at the appropriate time. Simultaneously, in further commissioning orders, the commissioners A to F are given those portions of the customers' orders to be contributed by the respective commissioner, via the alphanumeric display of the radio terminal 37. A certain distribution strategy of the orders to the individual commissioners A to F ensures the making ready of the finished orders in the desired, pre-determinable sequence. For this, the distributing algorithm described in the following is used in the control computer 29:

The customers' orders—and, following their distribution to the commissioners A to F, also the individual commissioning orders thereof, are numbered according to the required processing sequence in successively rising numbers, whereby also their priority of processing is determined. Commissioning orders with low consecutive number have higher priority for processing than commissioning orders of higher consecutive number.

Each commissioner A to F should first of all handle the products in his commissioning region, e.g. commissioner A in region $B_1$, commissioner B in Region $B_2$ and so on, and commissioner F in commissioning region $B_n$. If required, each commissioner may, however, also handle products of the neighbouring commissioner(s), e.g. commissioner A may additionally be acting in commissioning range $B_2$, commissioner B may additionally be acting in commissioning ranges $B_1$ and $B_3$ and so on, as is symbolically illustrated by solid lines in FIG. 6. Thus, it is possible to speak of a main commissioning region and one or two supplementary commissioning regions, allocated each commissioner A to F. Thus, it becomes possible that a commisioner A to F has access to the supplementary commissioning region, i.e. either a) to shelves 16, i.e. to the product region of the neighbour or neighbours, or b) to the trays 14 of the neighbour or neighbours, or c) to both, the shelves 16 and the trays 14 of the neighbour or neighbours.

It has proven that in practice the possibility described under item a) frequently is the most suitable and the most effective one, and thus is applied in the present embodiment and is used as a basis for the further description.

This strategy, according to which a single product can be reached by at least two or three commissioners, can be expanded to the next commissioner but one, so that each product can be reached by four or five commissioners.

In the beginning, the central belt 3 is set into continuous operation, i.e. the drive 34 is, e.g., an electric motor with a constant number of revolutions. At the site of transfer $3a$, there is a first collecting container 9 moved there by the conveying installation 8, for the first order $A_1$. The indication lights 19 activated by the control computer 29 via the automatic machine computer 31 flash at the respective trays 17 associated to the orders in the respective commissioning regions $B_1$, $B_2$, $B_3$, ... $B_n$.

Commissioners A to F start to work, and when they have finished an order, they actuate the quitting switch 20 at the respective tray 17. The central belt 3 is subdivided into segments in accordance with the orders, the length of the segments being individually determined by the control computer according to the volume of the order. Since the position of an order segment on the central belt is known to the control computer 29 due to the path sensor 32, the opening mechanism 24 of this tray 17 is actuated at the correct point of time so that the products get to the predetermined order segment (e.g. order $A_2$ in FIG. 2) of the central belt 3 via the opened bottom 21 of the tray 17. When a commissioner has finished a commissioning order, he or she receives the next commissioning order. As mentioned before, there, the control computer 29 subdivides customers' orders into commissioning orders corresponding to the portions of the product regions of the individual commissioners A to F. The commissioning orders receive the consecutive number of the customers' orders, and thus their priority of processing.

From the list of the commissioning orders to be processed, the control computer 29, according to the sequence of orders provided—determines the portions of the orders to be processed next by the commissioner and his (her) neighbours.

The commissioning order of the commissioner himself or herself has higher priority than the orders of his or her neighbours, so as to favor the commissioning order with the short periods of travel—the commissioning order in that product region which belongs to that commissioner. This is, e.g., achieved in that a constant, adjustable value is added in the computer to the consecutive number of the commissioning order.

From the two or three commissioning orders (if only the immediate neighbours are taken into consideration), the commissioning order to be processed now is determined, i.e. that having the lowest consecutive number. This may be the commissioner's own order, or an order of one of his neighbours.

To save trays, commissioning orders belonging to the same customer's order within neighbouring commissioning regions are taken together. In this case, only a single commissioner will deal with the sum of the commissioning orders.

Figure 7:
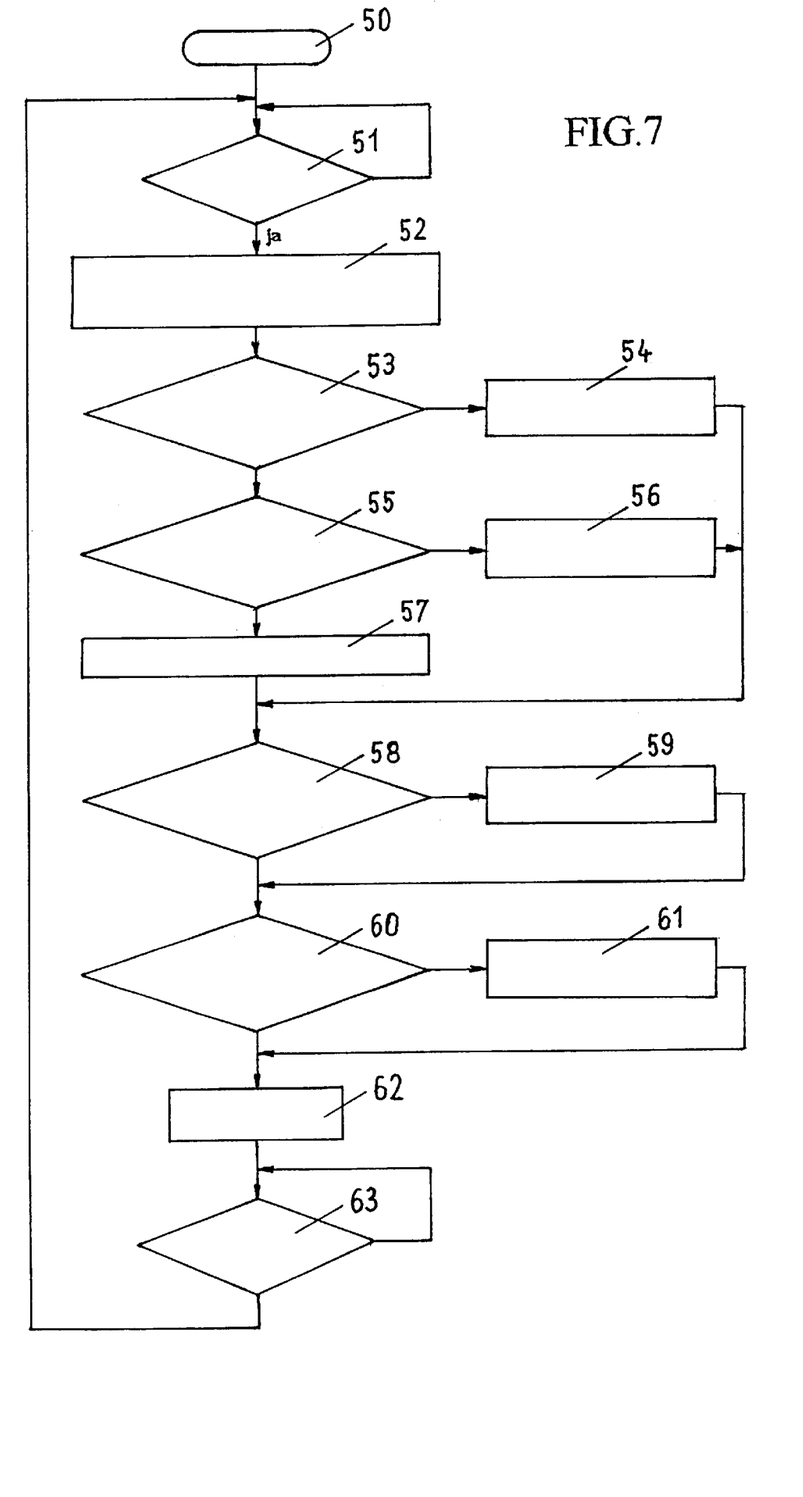
FIG. 7 shows the course of a program for the allocation strategy illustrated in FIG. 8.

This strategy of allocation is illustrated in the diagram of the course of program according to FIG. 7. After a starting step 50, it is inquired at the branch 51 if a commissioner has finished his order, i.e. if he or she has registered for a further order. This being the case, the priority stage of the next open commissioning order of the commissioner is increased by a threshold value, i.e. by a constant, adjustable value in the next processing unit 52. The purpose of priority rating is to keep the time of walking of the commissioners low by favouring their own commissioning region. If no commissioner is free, the inquiry is repeated in branch 51. In the consecutive branch 53 it is inquired whether or not the priority of the order of the neighbouring, left-hand commissioner is higher. If so, this commissioning order of the left-hand neighbour is accorded in accordance with a processing unit 54. If this is not the case, it is inquired in a further branch 55 whether or not the priority of the order of the neighbouring right-hand commissioner is higher. If so, this commissioning order of the neighbouring right-hand commissioner is allocated to the commissioner in question by a processing unit 56. If this is not the case, a separate commissioning order is allocated in a consecutive processing unit 57. The results of the processing units 54, 56 and 57 are checked in a branch 58 following these processing units as to whether the neighbouring left-hand commissioner still has unfinished portions of the same customer's order, or not. If so, the portion of the neighbouring right-hand commissioner is additionally allocated via a processing unit 59. If this is not the case, it is checked in a branch 60 following the branch 58 whether the neighbouring right-hand commissioner still has unfinished portions of this customer's order, or not. If so, the portion of the left-hand neighbour is additionally allocated, cf. processing unit 61. The reason of such concentrated allocation is the saving in commissioning containers used. The results of the processing unit 61 and the branch 60 meet in a processing unit 62, which gives the order for commissioning, whereupon it is proceeded to a further branch 63 where it is inquired if the commissioner has finished his or her (portion of the) order, i.e. quitted it. If a quitting has occurred by the commissioner, the procedure is repeated after the starting step 50. If no acknowledgement has occurred, it is again interrogated if an acknowledgement has occurred.

The importance of this allocation strategy for the functioning and efficiency of the manual commissioning installation 2 has been proven by aid of a computer simulation. This allocation strategy was then replaced in the computer simulation by a simplified strategy in which the commissioning orders were exclusively given according to the product selection of the respective commissioner so that there is no mutual access to storage locations by neighbouring commissioners.

Basic conditions common to both simulation runs:

| | |
|---|---|
| Duration of simulation | 5 hours |
| Number of commissioners | 20 |
| Trays per commissioner | 40 |
| Commissioning performance | 200 lines/h (equal for all) |
| Order size | 4 ± 3 order lines equally distributed |
| Order distance on the central belt | 3 m |
| Central belt speed | 1 m/s |

The access probability to the product regions of all the commissioners A to F was assumed to be equal.

In both simulation runs, identical order data were used. As a result, unproductive times show up, if a commissioner cannot do any work. This may happen if for a commissioner no commissioning order is available or if a commissioner cannot do his work despite an available order because there is no free tray in which he can deposit the commissioned products. The following results could be determined:

| | |
|---|---|
| Total unproductive time at first strategy | 0.00 h |
| Total unproductive time at simplified strategy | 1.09 h |

With the first strategy to be used there are absolutely no unproductive times. In contrast thereto, the simplified strategy leads to a loss of more than one work hour.

Figure 8:
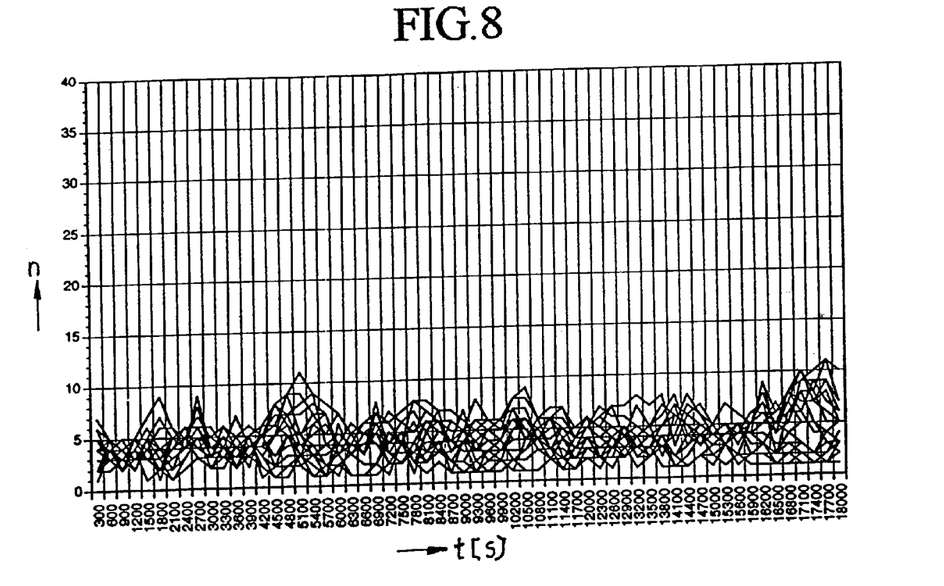
FIGS. 8 and 9 are diagrams illustrating the temporal course (t in seconds) of the filling of the containers (number n of the containers filled) in the manual commissioning installation for two different allocation strategies for the commissioners.
Figure 9:
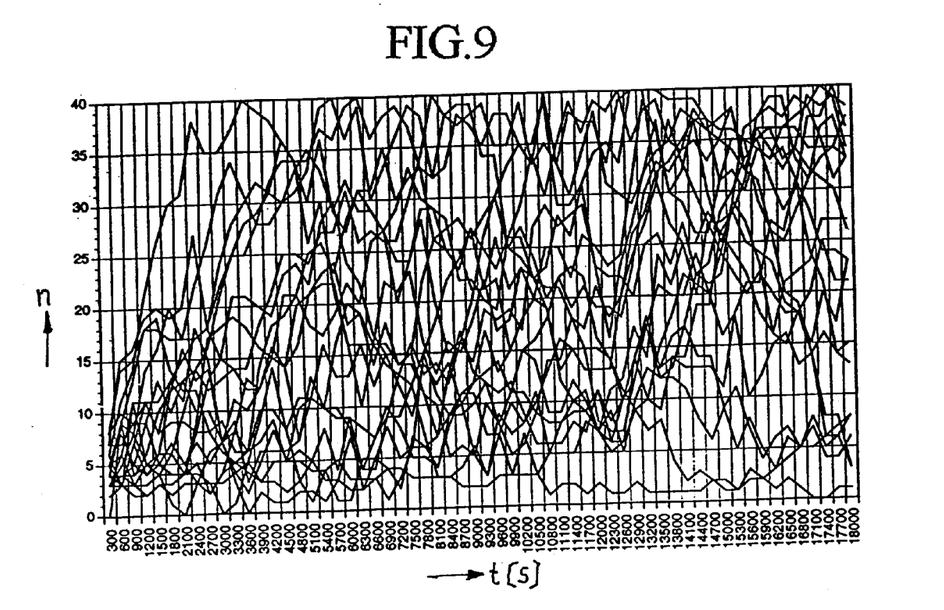

The diagrams according to FIGS. 8 and 9 illustrate the temporal course of the filling of trays for both allocation strategies, FIG. 8 illustrating the first strategy and FIG. 9 illustrating the simplified strategy, the time t in s (seconds) being plotted on the abscissa, and the number n of filled trays being plotted on the ordinate.

The diagrams according to FIGS. 8 and 9 show clearly that the use of the allocation strategy proposed is important for an effective use of the system.

Coming back to the entire commissioning system 1 ascording to FIG. 1, the orders are put together as follows:

The commissioners (A to F in FIG. 6) prepare portions of the client's order to be commissioned manually in the manual system 2. The availability of products from the commissioning machines 4 and 5 is checked by aid of sensors in the channels of the commissioning machines 4 and 5 as well as by aid of stocktaking by the main computer 30. If all the products of an order are available, the collecting containers 9 are transported on after the manual commissioning, from the transfer site 3a to the central belts 6, 7 of the commissioning machines 4, 5, from there (after filling) they get to the checking zone 11 and finally to the dispatching area 12, special articles, as has already been mentioned in the beginning, being commissioned directly into the collecting containers 9 in conventional manner, before reaching the checking zone 11. The conveying installation 8 is step-wise set in operation on the basis of the signals emitted by the control and automatic machine computers 29 and 31, respectively, the control computer 29 and the automatic machine computer 31, respectively, knowing the position of the collecting containers 9 due to the detector installation 33.

The commissioning system 1 described is to be seen as an example, i.e. it is also possible to arrange several manual commissioning systems 1 in parallel and/or to arrange only a sinlge automatic commissioning system or more than two commissioning machines 4, 5. In any event it is advantageous to arrange the manual commissioning systems 2 at the starting point of the flow of collecting containers 9. Since a start of a collecting container 9 takes place only if several commissionings of an order have been finished, the mean filling time of the trays 17 at the manual commissioning system 2 is kept low, and the number of trays 17 required per commissioner is reduced.

What is claimed is:

1. A commissioning system including:
   stock storage means for storing a plurality of products;
      at least one central conveyor for receiving products from said storage means in accordance with commissioning orders, said at least one central conveyor having a delivery end;
      a plurality of intermediate storage containers for temporarily receiving products from said storage means, said intermediate storage containers being stationarily mounted along and next to the at least one central conveyor with each intermediate storage container having discharge means for discharging products received therein to the at least one central conveyor;
      a conveying device for conveying collecting receptacles to a location adjacent the delivery end of the at least one central conveyor for receiving products discharged from the at least one central conveyor into respective receptacles in accordance with commissioning orders;
      said intermediate storage containers being combined to form a plurality of groups located in sequence along said at least one central conveyor, each group together with an adjacent portion of the stock storage means defining a commissioning zone; and
      computer means including a plurality of terminals for instructing a plurality of respective commissioning persons to manually transfer, in accordance with a commissioning order, products from the stock storage means to respective intermediate storage containers;
   wherein each of said terminals is primarily assigned to a specific primary commissioning zone and secondarily assigned to at least one adjacent commissioning zone for instructing said commissioning person assigned to said terminal with respect to transfer of products from said primary commissioning zone and said at least one secondary commissioning zone; and wherein said computer means is operatively connected to said discharge means for each of said intermediate storage containers to empty the products belonging to a respective commissioning order onto the at least one central conveyor for transfer to a respective collecting receptacle.

2. A commissioning system as set forth in claim 1, wherein each container has a quitting switch thereon connected to said computer means.

3. A commissioning system as set forth in claim 1, wherein each container has an indication light mounted thereon and connected to said computer means.

4. A commissioning system as set forth in claim 1, wherein each of said containers is formed by a tray having a bottom pivotally mounted thereon for downward pivotal movement and said discharge means is comprised of a controllable opening mechanism connected to said bottom and said computer means for opening and closing said tray.

5. A commissioning system as set forth in claim 1, further comprising support means for said intermediate storage container mounted above said at least one central conveyor and having a plurality of apertures therein in which said intermediate storage containers are disposed.

6. A commissioning system as set forth in claim 1, further comprising drive means for continuously driving said at least one central conveyor and sensor means operatively connected to said at least one central conveyor and said computer means for providing information regarding movement of said at least one central conveyor.

7. A commissioning system as set forth in claim 1, wherein said computer means is comprised of a control computer connected with a main computer for receiving orders and to demand products for the stock storage means and an automatic machine computer connected to sensor means, quitting switch and recognition means for said collecting receptacles adjacent said delivery end of said at least one central conveyor and said conveying means.

8. A commissioning system as set forth in claim 1, wherein said stock storage means is comprised of a plurality of shelves disposed adjacent said at least one central conveyor for storing products associated with the respective commissioning zone.

9. A commissioning system as set forth in claim 1, wherein said at least one central conveyor is sub-divided into segments according to the size of an order with the length of the segment being individually controlled by said computer means.

10. A commissioning system as set forth in claim 1, further comprising additional central conveyors having associated stock storage means and intermediate storage containers for supplying commissioning orders to said collecting receptacles.

11. A commissioning system as set forth in claim 1, further comprising checking means disposed adjacent said conveying device for checking products in said collecting receptacles.

12. A commissioning system as set forth in claim 1, further comprising supply means for supplying special products into said collecting receptacles upstream of said checking means.

* * * * *